Patented Aug. 18, 1953

2,649,397

UNITED STATES PATENT OFFICE 2,649,397

FUNGICIDAL COMPOSITIONS AND METHOD OF FUNGUS CONTROL COMPRISING HYDROCARBYL-SUBSTITUTED PYRIMIDINES

Seaver A. Ballard, Orinda, Calif., assignor to Shell Development Company, San Francisco, Calif., a corporation of Delaware No Drawing. Application May 31, 1950, Serial No. 165,375

20 Claims. (Cl. 167—33)

1

This invention relates to fungicidal compositions and also is concerned with a process of fungus control. More particularly, this invention is directed to the use of certain tetrahydropyrimidines in fungicidal compositions.

The control of fungus diseases in agricultural areas and especially on trees and crops has received wide-spread attention over a long period. Fruit trees, for example, are sprayed at a number of times during a season for the purpose of controlling either insects or diseases. Crops, likewise, must be protected against the injury caused by the attack of phytopathogenic organisms, especially where they are subject to prolonged humid conditions.

The substantial part of past investigations has been concerned with the use of inorganic agents for fungus control. While organic materials have received limited attention for this purpose, they are, in many instances, limited in their utility by their phytotoxic characteristics and often fail to resist weathering. Because of such properties, many organic materials may be used for the preservation of such materials as wood or marine piling but could not be used on growing plants or trees. It is possible to apply some of these organic substances to plants in sufficiently great dilution that their phytotoxic properties are repressed, but in most instances their fungicidal activity then is too low to be of utility.

It is an object of the present invention to provide new fungicidal compositions which exhibit substantially no phytotoxicity when applied to foliage and crops in concentrations high enough to effectively control certain plant diseases. It is another object of this invention to describe a new process for controlling fungi. Other objects will become apparent during the following discussion.

Now, in accordance with the present invention, it has been found that tetrahydropyrimidine derivatives having at least nine carbon atoms per molecule show outstanding fungicidal and fungistatic properties and at the same time do not exhibit appreciable phytotoxic activity when used in fungus controlling concentrations. According to one phase of the present invention, it has been found that complete control of certain plant diseases has been obtained in the absence of phytotoxic action when the composition applied to the plant contains .0005–.1% by weight of the tetrahydropyrimidine. Preferably, these fungicidal agents are dispersed in a solid or liquid carrier as more particularly described hereinafter.

The classes of tetrahydropyrimidines having at least nine carbon atoms may be divided into three groups, namely, 1,2,3,4-tetrahydropyrimidines, 2,3,4,5-tetrahydropyrimidines and 3,4,5,6-tetrahydropyrimidines. The alkyl substituted derivatives of these three groups having at least nine carbon atoms are preferred for the present purpose although substitution with organic radicals of other configurations may be used.

The preferred group for use as a fungicidal agent includes the 3,4,5,6-tetrahydropyrimidines and especially those having from nine to thirty carbon atoms per molecule and at least four separate hydrocarbyl groups directly attached to at least three nuclear carbon atoms. The outstanding species of this group is 2-heptadecyl-4,4,6-trimethyl-3,4,5,6-tetrahydropyrimidine. Preferably, this group of pyrimidines has from eighteen to twenty-six carbon atoms, and the optimum configuration may be described as a 2-alkyl-4,4,6-trialkyl-3,4,5,6-tetrahydropyrimidine wherein the alkyl group in the 2- position has from ten to twenty-three carbon atoms. Still more preferably, the alkyl radicals in the 4,4,6-position are methyl groups. Other outstanding configurations within this class include 2-alkaryl-4,4,6-trialkyl-3,4,5,6-tetrahydropyrimidines, particularly those in which the alkaryl group contains from ten to twenty-three carbon atoms. It will be understood that the technical preparation of these materials usually produces mixtures of isomers; an appreciable but minor amount of any given tetrahydropyrimidine preparation may be isomeric materials other than those specifically named. The following species are typical 3,4,5,6-tetrahydropyrimidines having the preferred configuration given above:

2-decyl-4,4,6-trimethyl-3,4,5,6-tetrahydropyrimidine
2-dodecyl-4,4,6-trimethyl-3,4,5,6-tetrahydropyrimidine
2-tetradecyl-4,4,6-trimethyl-3,4,5,6-tetrahydropyrimidine
2-octadecyl-4,4,6-trimethyl-3,4,5,6-tetrahydropyrimidine 2-tetradecyl-4,4,6- triethyl-3,4,5,6- tetrahydropyrimidine 2-dodecyl-4,4,6-triisopropyl-3,4,5,6-tetrahydropyrimidine 2-decyl-4,4,6- tributyl- 3,4,5,6- tetrahydropyrimidine While the above species are typical of the preferred configuration, other substituted 3,4,5,6-tetrahydropyrimidines are also effective for the present purpose. The following species are illustrative of those which may be used:

2-para-tert- butylbenzyl-4,4,6- trimethyl-3,4,5,6-tetrahydropyrimidine
2,3,4,5-tetraethyl-3,4,5,6-tetrahydropyrimidine
2,3,4,5-tetra-isopropyl-3,4,5,6- tetrahydropyrimidine
2-heptadecyl-3,4,5,6-tetrahydropyrimidine
4-octadecyl-3,4,5,6-tetrahydropyrimidine
2-heptadecenyl- 4,4,6- trimethyl-3,4,5,6- tetrahydropyrimidine The 3,4,5,6-tetrahydropyrimidines having at least nine carbon atoms may be prepared by several known methods. One process comprises heating a carboxylic acid and an alpha-gamma-alkylenediamine (or its hydrochloride salt) in the presence of a dehydration catalyst. In place of the carboxylic acid, the corresponding halides, anhydrides, amides or esters may be used. Dehydration catalysts such as sulfuric acid and sulfonic acids, such as para-toluene sulfonic acid, are effective. These should be present in an amount between about .001 and about .1 moles per mole of carboxylic acid. The diamine should be present in slight excess; inert diluents, such as xylenes, may be employed. The reaction usually requires from 4 to 300 hours at temperatures between about 60° and 285° C., during which period the water of condensation is continuously removed. The following is a description of a typical preparation:

A mixture of one mole of 2-methyl-2,4-diaminopentane, one mole of stearic acid and about 150 grams of xylene were refluxed with one gram of sulfuric acid, taking off the lower phase of the distillate, which was a mixture of amine and water. About 0.5 mole of the same amine was added during the reaction. In 116 hours, 1.5 moles of water were distilled. The product so obtained was analyzed and proved to contain 41% yield (based on the stearic acid) of 2-heptadecyl-4,4,6-trimethyltetrahydropyrimidine and 50% of the stearic acid salt thereof. The stearic acid used in these preparations was the usual acid of commerce which contains about equal amounts of stearic and palmitic acids with small amounts of oleic acid. The pyrimidine was therefore a mixture of the 2-heptadecyl and 2-pentadecyl with small amounts of 2-heptadecenyl.

Corresponding reactions were carried out using lauric acid with 2-methyl-2,4-diaminopentane and para-tert-butylbenzoic acid with the same diamine. These two reactions produced 2-undecyl-4,4,6-trimethyl tetrahydropyrimidine and 2-(para-tert-butylbenzyl) 4,4,6-trimethyl tetrahydropyrimidine, respectively. All of these compounds were found to have high fungicidal activity.

Another method suitable for the preparation of 3,4,5,6-tetrahydropyrimidines comprises heating a carboxylic acid amidine with an alpha-gamma-alkylene dibromide.

The tetrahydropyrimidines described herewith normally are solid materials having a glassy or waxy appearance. These usually boil between about 140° and 200° C. at 3 mm. Hg pressure and have melting points between about 40° and 80° C. The following physical characteristics are typical:

| Product | °C./mm.Hg | Melting Pt., °C. |
|---|---|---|
| 2 - pentadecyl - 4,4,6 - trimethyl - 3,4,5,6 - tetrahydropyrimidine | 176/3.5-190/2.5 | 72-2.5 |
| 2 - heptadecyl - 4,4,6 - trimethyl - 3,4,5,6 - tetrahydropyrimidine | 188-196/3 | 77.0 |
| 2-undecyl-4,4,6-trimethyl - 3,4,5,6-tetrahydropyrimidine | 140-143/2 | 59-61 |
| 2 - (para - tert. - butylphenyl) - 4,4,6 - trimethyl-3,4,5,6-tetrahydropyrimidine | 158-163/3 | |

Another class of highly effective fungicidal agents for use in the present compositions are the 2,3,4,5-tetrahydropyrimidines having at least nine carbon atoms. Preferably, these have from nine to thirty carbon atoms and contain at least five hydrocarbyl groups directly attached to not less than three nuclear carbon atoms. The optimum configurations are described as 2,4-dimethyl - 2,4,6 - trialkyl - 2,3,4,5 - tetrahydropyrimidines. The most effective species of this latter class is 2,2,4,4,6-pentamethyl-2,3,4,5-tetrahydropyrimidine. The following species are typical of those coming within the class having optimum configuration:

2,4 - dimethyl - 2,4,6 - triethyl - 2,3,4,5 - tetrahydropyrimidine
2,4 - dimethyl - 2,4,6 - triisopropyl - 2,3,4,5 - tetrahydropyrimidine
2,4 - dimethyl - 2,4,6 - tributyl - 2,3,4,5 - tetrahydropyrimidine
2,4 - dimethyl - 2,4,6 - trioctyl - 2,3,4,5 - tetrahydropyrimidine Other 2,3,4,5-tetrahydropyrimidines which are effective for the present purpose are exemplified by those contained in the following list:

2,2,4,4,6 - pentaethyl - 5 - methyl - 2,3,4,5 - tetrahydropyrimidine
2,2 - diethyl - 4,4 - dipropyl - 2,3,4,5 - tetrahydropyrimidine
6-heptadecyl-2,3,4,5-tetrahydropyrimidine
4-dodecyl-2,3,4,5-tetrahydropyrimidine
4,4 - dioctyl - 5,5 - dimethyl - 2,3,4,5 - tetrahydropyrimidine The 2,3,4,5-tetrahydropyrimidines are conveniently prepared by reacting ammonia or a primary amine with a ketone, such as acetone, or its homologues in the presence of an acidic condensation catalyst. The acidic condensation catalysts useful in the preparation of this group of derivatives (as well as in the preparation of the class initially described) includes acetic acid, oxalic acid, hydrochloric acid, nitric acid, sulfuric acid, hydrobromic acid and phosphoric acid. Acidic salts likewise may be employed, such as zinc chloride, ferric chloride, ammonium chloride and calcium chloride, all of which give acid reaction in aqueous solution. Good results are obtained when the catalyst is employed in amounts between .0001 to .1 and preferably .001 to .01 mole of catalyst per mole of ketone reactant in the latter class or carboxylic acid in the novel class originally described.

The 2,3,4,5 - tetrahydropyrimidines normally have boiling points above about 150° C. The following properties are typical of this type of tetrahydropyrimidine.

|  | Boiling Point | Refractive Index $N_{D_{20}}$ | Sp. Gr. |
|---|---|---|---|
| 2,2,4,4,6-pentamethyl-2,3,4,5-tetrahydropyrimidine. | 170° C | 1.4560 | 0.883 |
| 2,4-dimethyl-2,4,6-triethyl-2,3,4,5-tetrahydropyrimidine. | 151° C. at 100 mm. | 1.4639 | 0.8867 |

1,2,3,4-tetrahydropyrimidines may be used in the present fungicidal compositions, especially those which have ten to thirty carbon atoms and contain at least six hydrocarbyl groups directly attached to not less than four nuclear carbon or nitrogen atoms. Preferably, the 2,2-dimethyl-4,4,5,6 - tetraalkyl - 1,2,3,4 - tetrahydropyrimidines are used. Typical species having the latter configuration are the following:

2,2 - dimethyl - 4,4,5,6 - tetraethyl - 1,2,3,4 - tetrahydropyrimidine
2,2 - dimethyl - 4,4,5,6 - tetrapropyl - 1,2,3,4 - tetrahydropyrimidine
2,2,4,4 - tetramethyl - 5,6 - dioctyl - 1,2,3,4 - tetrahydropyrimidine
2,2,4,4 - tetramethyl - 5,6 - diisobutyl - 1,2,3,4-tetrahydropyrimidine Other derivatives which may be employed in place of or in addition to those described hereinbefore include those contained in the list given below:

2,5,-dicyclohexyl-1,2,3,4-tetrahydropyrimidine
4,4 - diisopropyl - 6 - octyl - 1,2,3,4 - tetrahydropyrimidine
6-heptadecyl-1,2,3,4-tetrahydropyrimidine
6-dodecyl-1,2,3,4-tetrahydropyrimidine
2,4,6-trioctyl-1,2,3,4-tetrahydropyrimidine The carriers which are used in the compositions and process of this invention include especially organic solvents, aqueous emulsions and solid carriers which may be either dusts or gels. Hydrocarbon oils comprise the preferred type of carrier especially for the preparation of concentrates or for use in emulsified form as the fungicide. Preferably, the hydrocarbon oils are of petroleum origin and have been highly refined to remove a large proportion of the aromatic and olefinic hydrocarbons which may be present. Typical spray oils have viscosities from 30 to 100 SSU at 100° F. and preferably between 40 and 85. Petroleum oils within this viscosity range generally are referred to as kerosenes, diesel oils and gas oils and should have an unsulfonatable residue (de Ong) above about 80% and preferably above 90%. In order to ensure maximum safety from phytotoxic activity, the hydrocarbon oil should contain more than about 95% unsulfonatable residue.

Compositions having hydrocarbon oil carriers are divided into two principal classes. These include concentrates such as those which would be marketed for dilution just prior to use in spraying. The concentrates preferably contain from about 10 to about 30% by weight of tetrahydropyrimidines, still more preferably, from about 20-25%. If the final spray is to be used with a hydrocarbon oil carrier, the composition should contain from about 0.0005 to 0.1% by weight of tetrahydropyrimidines. For most purposes, it will be found that the most effective range is 0.005 and 0.05% while the optimum range is between 0.0075 and 0.035% by weight of the total composition.

For economic reasons and for certain technical purposes as well, the oil solutions of the present agents may be dispersed as aqueous emulsions. In such a case, the principal vehicle is water containing a minor amount of the oil solution of the tetrahydropyrimidine. In addition to the hydrocarbon solvent, coupling agents may be employed for the purpose of promoting ready dispersion in water. Coupling agents are briefly described as water-soluble solvents for the fungicide being used. These include organic materials such as alcohols, ketones, cresols and glycol ethers. They are typified by isopropyl alcohol, methyl ethyl ketone, cresote, and diethylene alcohol monomethyl ether. Emulsifying agents are usually present when the sprays are to be distributed as aqueous emulsions. Any of the typical emulsifying agents well known in the art may be employed. These include alkanol amines such as diethanol amine or triethanol amine, soaps such as sodium stearate and sodium abietate; sulfonates including sodium petroleum sulfonates and various cresols such as wood tar cresols or guaiacol.

A preferred emulsifiable concentrate contains the following ingredients as expressed in weight percentages:

|  | Per cent |
|---|---|
| Tetrahydropyrimidine | 10–30 |
| Emulsifying agent | 0.5–10 |
| Coupling agents | 0.1–1 |
| Spray oils | Balance |

When the above concentrates are to be diluted for use in fungus control, the final emulsion should comprise a major amount of water having dispersed therein enough of the above type of concentrate to give a tetrahydropyrimidine content of from about 0.0005 to about 0.1% by weight of the total composition.

In some instances, the application or incorporation of a fungicide in a carrier such as a dust is desired, as, for example, in the treatment of seeds or for application to foliage. All members of the generic group of tetrahydropyrimidine derivatives may be formulated with dusts such as pyrophylite, vegetable flour, silica gel, bentonite, and other clay-like substances, preferably, in the case of clays, being those having an ion-exchange capacity.

One preferred type of solid carrier for the defined class of fungicides comprises ion-exchange colloids such as clays, for the purpose of fixing the fungicide. In this case, a preferred process for preparation of the fungicidal composition comprises dispersing the clay in water to form a clay hydrate, which is then coagulated by addition of the pyrimidine derivative preferably in water-soluble or dispersible form. Such a form ordinarily is a hydro-halide salt of the pyrimidine derivative. The pyrimidine enters an ion-exchange reaction with the clay, and the gel which coagulates may be separated and washed previous to drying. Concentrates may be prepared containing from 5% to 40% by weight (based on the clay) of the pyrimidine derivative in fixed form.

One special utility of clays treated in this manner depends upon the oleophilic character imparted thereto by ion-exchange reaction with the pyrimidine derivative. This characteristic may be utilized in the formation of thickened oil suspensions or grease-like concentrates which do not settle on long standing or freezing. These concentrates may be diluted prior to use by stirring with an organic or aqueous diluent. Alternatively, the grease-like compositions may be applied, for example, to wooden structures to prevent fungus growths thereon.

The agricultural utilization of clay compositions is ordinarily in the form of the powder-like dry material. In this form, they may be dusted on the foliage of either plants or trees, especially where a lasting effect is desired. Due to the cationic surface-active characteristics of the pyrimidine derivatives and also due to the oleophilic nature of either the derivatives or their ion-exchange reaction products with clay, they resist the washing action of rain or spray irrigation.

Compositions preferably having concentrations of 0.005 to 0.05% toxicant in water or other carrier, may be applied to foliage of apple trees for the control of apple-scab fungus, *Venturia inaequalis*, and other pests. Still more preferably, the concentration is between 0.0075 and 0.035% by weight of the total composition. At similar concentrations the compositions may be used in the washing of oranges or apples for the inhibition of pathogens; for protection of seeds; for the drenching of flats of onion and similar seedlings; for the prevention of damping-off; and for the finishing of textiles to reduce mildew deterioration. They also can be used on surfaces containing fats or waxes where the prevention of mold growth is desirable, such as on cured meats, hides or vegetables. The oil-soluble members of this group, designated above, also are soluble in such organic solvents as dichlorodibromomethane, diethyl ether and methyl chloride, which makes them ideally adapted for use in aerosol form. In this method of dispersion, they can be used for the treatment of tobacco-seed beds for the control of downy mildew and for the control of fungus and bacterial contaminants in storage and warehouse rooms.

The technique used for evaluating the fungicidal value of the compounds was essentially that suggested by the Committee on Standardization of Fungicidal Tests (The Slide Germination Method of Evaluating Protectant Fungicides, Phytopath. 33, 627–32 [1943]). Since this method was designed for the testing of particulate compounds and the tetrahydropyrimidine derivatives are normally employed in true solution or molecular dispersion, the liquid was applied as a uniform drop of known volume and toxicant content, rather than spraying on the slides. Spores of *Monolinia fructicola* and *Alternaria oleraccae* were used as the test fungus and counts of spores germinated were made and plotted on a logarithmic-probability scale so that a straight-line probability curve could be obtained, thus making possible the determination of points not found experimentally by interpolation, and extrapolation. The concentration of the various tetrahydropyrimidine derivatives required to kill 50% (L. D. 50) was obtained by this procedure. The fungitoxicity data obtained on some of the tetrahydropyrimidine derivatives employed are summarized in the following table:

| Compound | L. D. 50, p. p. m. |
| --- | --- |
| 2-heptadecyl-4,4,6-trimethyl-3,4,5,6-tetrahydropyrimidine. | 0.3–0.6. |
| 2-undecyl-4,4,6-trimethyl-3,4,5,6-tetrahydropyrimidine. | 2.0–5.0. |
| 2-heptadecyl-3,4,5,6-tetrahydropyrimidine | 2.0–5.0. |
| 2,2,4,4,6-pentamethyl-2,3,4,5-tetrahydropyrimidine. | less than 16. |
| 2-(para-tert-butylphenyl)-4,4,6-trimethyl-3,4,5,6-tetrahydropyrimidine. | Do. |

In order to determine the phytotoxicity of the present class of compounds, the following experiments were performed:

An oil concentrate solution was prepared having the following composition:

92.75 parts by weight kerosene
4 parts by weight 2-heptadecyl-4,4,6-trimethyl-3,4,5,6-tetrahydropyrimidine
3 parts by weight octylphenol-ethylene oxide condensation product
0.25 part by weight meta-cresol.

The above concentrate was diluted with water sufficiently to produce an oil-in-water emulsion containing 0.04% by weight of the pyrimidine derivative. It was found that this composition, when sprayed on celery plants, resulted in no injury to the plants; only very slight injury occurred when the composition was sprayed on tomato and potato plants. For the purpose of comparison, 2-heptadecyl glyoxalidine was applied in the same type of composition, and the same concentration. It was found that all three types of plants were badly burned by the glyoxalidine derivative. The pyrimidine derivative, as applied above, showed full control of late blight on potato plants and early blight on tomato plants. The concentrate described above was also further diluted with water to form an oil-in-water emulsion containing 0.008% by weight of the pyrimidine derivative. Complete control of early blight on tomato and late blight on potato plants was still obtained at this concentration.

The invention claimed is:

1. A fungicidal concentrate composition containing a substituted tetrahydropyrimidine having only hydrocarbyl substituents and having a hydrocarbon group of from 10 to 23 carbon atoms attached directly to the 2-position of the tetrahydropyrimidine ring, said composition also containing a surface active agent suitable for dispersing said composition in water.

2. A fungicidal concentrate composition containing a substituted 3,4,5,6-tetrahydropyrimidine having only saturated aliphatic hydrocarbon substituents, one of said substituents being a saturated aliphatic hydrocarbon group of from 10 to 23 carbon atoms attached directly to the 2-position of the tetrahydropyrimidine ring, said composition also containing a surface active agent suitable for dispersing said composition in water.

3. A fungicidal concentrate composition containing an alkyl substituted tetrahydropyrimidine having a saturated aliphatic hydrocarbon group of 17 carbon atoms attached directly to the 2-position of the tetrahydropyrimidine ring, said composition also containing a surface active agent suitable for dispersing said composition in water.

4. A fungicidal concentrate composition containing a 2-heptadecyl-3,4,5,6-tetrahydropyrimidine, said composition also containing a surface active agent suitable for dispersing said composition in water.

5. A fungicidal concentrate composition containing 2-heptadecyl-4,4,6-trimethyl-3,4,5,6-tetrahydropyrimidine, said composition also containing a surface active agent suitable for dispersing said composition in water.

6. The method of combating fungi which comprises treating growing plants subject to attack by said fungi with a composition containing a substituted tetrahydropyrimidine having only hydrocarbyl substituents and having a hydrocarbon group of from 10 to 23 carbon atoms directly attached to the 2-position in the tetrahydropyrimidine ring.

7. The method of combating fungi which comprises treating growing plants subject to attack by said fungi with a composition containing 2-heptadecyl - 4,4,6 - trimethyl - 3,4,5,6 - tetrahydropyrimidine.

8. The method of combatting fungi which comprises treating growing plants subject to attack by said fungi with a composition containing a substituted tetrahydropyrimidine having only saturated aliphatic hydrocarbon substituents and having an alkyl group of from 10 to 23 carbon atoms directly attached to the 2-position in the tetrahydropyrimidine ring.

9. A fungicidal concentrate composition containing a substituted tetrahydropyrimidine having only saturated aliphatic hydrocarbon substituents and having an alkyl radical of from 10 to 23 carbon atoms attached directly to the 2-position of the tetrahydropyrimidine ring, said composition also containing an emulsifying agent suitable for dispersing said composition in water.

10. A fungicidal composition comprising a substituted tetrahydropyrimidine having only saturated aliphatic hydrocarbon substituents and having an alkyl radical of from 10 to 23 carbon atoms attached directly to the 2-position of the tetrahydropyrimidine ring, and an inert finely-divided solid carrier therefor.

11. A fungicidal composition comprising 2-heptadecyl - 4,4,6 - trimethyl - 3,4,5,6 - tetrahydropyrimidine and an inert finely divided solid carrier therefor.

12. A fungicidal composition comprising a substituted tetrahydropyrimidine having only hydrocarbyl substituents and having a hydrocarbon group of from 10 to 23 carbon atoms attached directly to the 2-position of the tetrahydropyrimidine ring, and an inert finely-divided solid carrier therefor.

13. A fungicidal composition comprising an aqueous dispersion containing a substituted tetrahydropyrimidine having only hydrocarbyl substituents and having a hydrocarbon group of from 10 to 23 carbon atoms attached directly to the 2-position of the tetrahydropyrimidine ring, and a surface active agent.

14. The method of combating fungi which comprises treating growing plants subject to attack by said fungi with a composition containing a substituted tetrahydropyrimidine having only hydrocarbyl substituents and having an alkaryl group of from 10 to 23 carbon atoms attached directly to the 2-position of the tetrahydropyrimidine ring.

15. A fungicidal concentrate composition containing a substituted tetrahydropyrimidine having only hydrocarbyl substituents and having an alkaryl group of from 10 to 23 carbon atoms attached directly to the 2-position of the tetrahydropyrimidine ring, said composition also containing a surface active agent suitable for dispersing said composition in water.

16. A fungicidal composition comprising a substituted tetrahydropyrimidine having only hydrocarbyl substituents and having an alkaryl group of from 10 to 23 carbon atoms attached directly to the 2-position of the tetrahydropyrimidine ring, and an inert finely-divided solid carrier therefor.

17. A fungicidal composition comprising an aqueous dispersion containing a substituted tetrahydropyrimidine having only hydrocarbyl substituents and having an alkaryl group of from 10 to 23 carbon atoms attached directly to the 2-position of the tetrahydropyrimidine ring, and a surface active agent.

18. The method of combating fungi which comprises treating growing plants subject to attack by said fungi with a composition containing 2-(para - tert. - butylphenyl) - 4,4,6 - trimethyl-3,4,5,6-tetrahydropyrimidine.

19. A fungicidal concentrate composition containing 2 - (para - tert. - butylphenyl) - 4,4,6-trimethyl - 3,4,5,6 - tetrahydropyrimidine, said composition also containing a surface active agent suitable for dispersing said composition in water.

20. A fungicidal composition comprising 2-(para - tert. - butylphenyl) - 4,4,6 - trimethyl-3,4,5,6-tetrahydropyrimidine and an inert finely-divided solid carrier therefor.

SEAVER A. BALLARD.

References Cited in the file of this patent

UNITED STATES PATENTS

| Number | Name | Date |
|---|---|---|
| 2,415,047 | Senkus | Jan. 28, 1947 |
| 2,540,170 | Law | Feb. 6, 1951 |

FOREIGN PATENTS

| Number | Country | Date |
|---|---|---|
| 547,057 | Germany | Mar. 18, 1932 |
| 598,927 | Great Britain | Mar. 1, 1948 |
| 704,410 | Germany | Feb. 27, 1941 |